United States Patent [19]
Jansson

[11] 4,014,672
[45] Mar. 29, 1977

[54] GAS FILTER TUBE LOCKING APPARATUS
[75] Inventor: Staffan Jansson, Vaxjo, Sweden
[73] Assignee: Aktiebolaget Svenska Flaktfabriken, Nacka, Sweden
[22] Filed: Jan. 8, 1976
[21] Appl. No.: 647,306
[30] Foreign Application Priority Data
  Jan. 13, 1975  Sweden ............................ 7500294
[52] U.S. Cl. .................................. 55/357; 55/379
[51] Int. Cl.² ...................................... B01D 46/00
[58] Field of Search ............ 55/378, 379, 341, 502, 55/357; 210/323; 285/DIG. 22, 205, 162, 222, 382.5

[56] References Cited
UNITED STATES PATENTS

| 735,904 | 8/1903 | Picher et al. | 55/341 WT |
| 2,460,580 | 2/1949 | Huber | 285/194 |
| 2,503,568 | 4/1950 | Timm | 55/379 |
| 3,451,197 | 6/1969 | Ballard | 55/341 NT |
| 3,937,621 | 2/1976 | Gravely | 55/378 |

FOREIGN PATENTS OR APPLICATIONS

| 887,772 | 1/1962 | United Kingdom | 55/379 |
| 1,375,188 | 11/1974 | United Kingdom | 210/323 T |

Primary Examiner—Bernard Nozick
Attorney, Agent, or Firm—Howson and Howson

[57]  ABSTRACT

Apparatus for detachably locking a gas filter in operative position in a wall opening, wherein the upper end of the bag has a circumferential thickened portion which is retained, in a converging section of a socket mounted in the opening, by means of a locking cylinder which fits closely within the socket and within the upper end of the bag and is readily insertable and removable by means of a foldable handle thereon.

10 Claims, 3 Drawing Figures

GAS FILTER TUBE LOCKING APPARATUS

This invention relates to filter locking apparatus for detachably locking a gas filter in operative position.

Bag filters are commonly locked in place by means of clamps, locking-strips and similar devices requiring special equipment or other means for their fastening or unlocking. Since great numbers of such locking devices can be required, and since filters may have to be exchanged relatively frequently, the mere handling of the locking devices can itself consume a considerable amount of time. These devices are further generally relatively unwieldy, and represent besides a not inconsiderable additional cost, both obvious disadvantages. With the relatively prolonged use of the filter material and with the filter assembly exposed to vibrations and tear, the locking of the filter by means of these conventional devices often wears them out because the conventional fastening devices generally exhibit sharp edges, point or linear locking surfaces, rigid fastening grips etc. which can easily cause breakage unless high-grade filtering material is used which would otherwise not be required. Finally, the presence of such special locking devices can be disadvantageous for the work procedure itself. In some instances conventional locking devices cannot even be used, for example where highly sensitive filtering material is being used. In such instances it has become necessary to change the shape or construction of the filter, or to devise even more complicated fastening devices. Protruding locking devices also render cleaning more difficult and can cause various accidents, for example during the exchange or inspection of the filters.

The purpose of the invention at hand is to counteract the above-outlined disadvantages, to largely remove them, and in general to advance technology by devising a universally advantageous filter locking device.

The invention accomplishes this objective by filter locking apparatus described in the following specification and in the drawings in specific embodiments, and defined in the appended claims. In the drawings:

Figure 1:
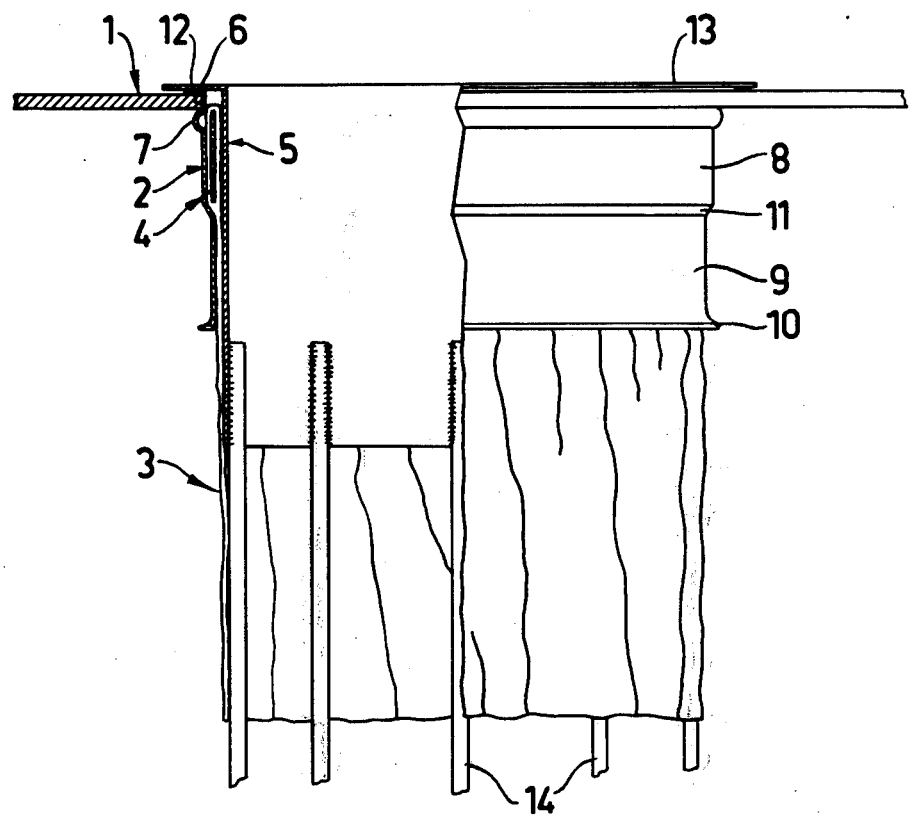
FIG. 1 is a side view, partly in section, of a preferred embodiment of filter locking apparatus according to the invention.

In the drawings, numeral 1 represents the wall of a filtering device with, for example, one or more circular openings 6, into each of which is inserted a tight fitting socket 2 holding the bag filter 3. One of the ends of socket 2 can be fixed at its respective opening 6 without protruding above the wall, for example by cementing or by welding. Immediately below and against the wall 1, socket 2 is provided with an outwardly protruding semi-annular bulge 7 whose outer diameter exceeds that of the opening 6. Below the bulge, socket 2 extends downwardly in the form of a circular cylindrical section 8 of approximately the same diameter as the opening 6.

Finally, the lower, free end of socket 2, about half as long as the entire socket, is shaped as a section of somewhat reduced diameter 9 whose free lower rim advantageously ends with a smaller trumpet-shaped collar. A relatively short phase 11 of the socket can conveniently form the transition between section 8 and 9; phase 11 can extend at any of various angles. A 45° angle is probably the best solution, eliminating sharp edges and favoring an effect better described below.

As shown in FIG. 1, socket 2 can of course also pass upward through opening 6 to terminate in an appropriate form, preferably in the form of collar 12 which rests against the opening 6 of the wall. Socket 2 is in this manner always held in the fixed position shown in the drawings.

Upper end 4 of bag filter 3 is fastened in socket 2 according to the invention by means of a circular thickening provided at its upper end which can at least partly fill section 8 of socket 2 without noticeably protruding inward radially beyond the inner diameter of section 9. The circular thickening 4 can advantageously be somewhat shorter in height than section 8, so as not to protrude under any circumstances above the upper side of wall 1 or of collar 12. Thickening 4 can be made self-expanding, i.e. so as to bear against the inner side of section 2 with a substantial degree of elasticity.

Thickening 4 can instead be made so as to be in non-elastic contact with section 8, in which case, or for other reasons, a locking cylinder 5 can be inserted in socket 2 and the bag filter 3, which cylinder as shown in the drawings is pushed from above into the socket provided with a bag filter, until it reaches its fully-inserted position with its flange 13 lying against the collar 12 of socket 2, or against the upper side of wall 1 if collar 12 is not used. In the other direction the inserted locking cylinder 5 can, if desired, protrude somewhat above the socket 2. The external diameter of the locking cylinder 5 is chosen so that the cylinder can slide into socket 2 containing the bag filter without damaging the filter, but without great clearance. Meanwhile, thickening 4 is clamped between the socket section 8 and the locking cylinder and acts as a convenient gas seal or packing. The tight sealing effect is enhanced or created by the bag filter which draws the thickening 4 towards phase 11 along the axial direction. As a result of the convergence of phase 11 in the direction toward section 9, the thickening 4 is also pressed tightly against the locking cylinder so that the sealing area proper is conveniently formed by phase 11 and the area of the locking cylinder 5 facing it. The means for the axial stretching of each bag filter are in themselves known and require no detailed description here. The locking cylinder 5 can, if desired, be provided with axial rods 14 or their equivalents which, distributed equally around the circumference of the cylinder, are preferably welded to its inner wall at one of their terminals, with the rods or their equivalents forming a fixture i.e. a locking device for the cylindrical shape of the bag filter.

Figure 2:
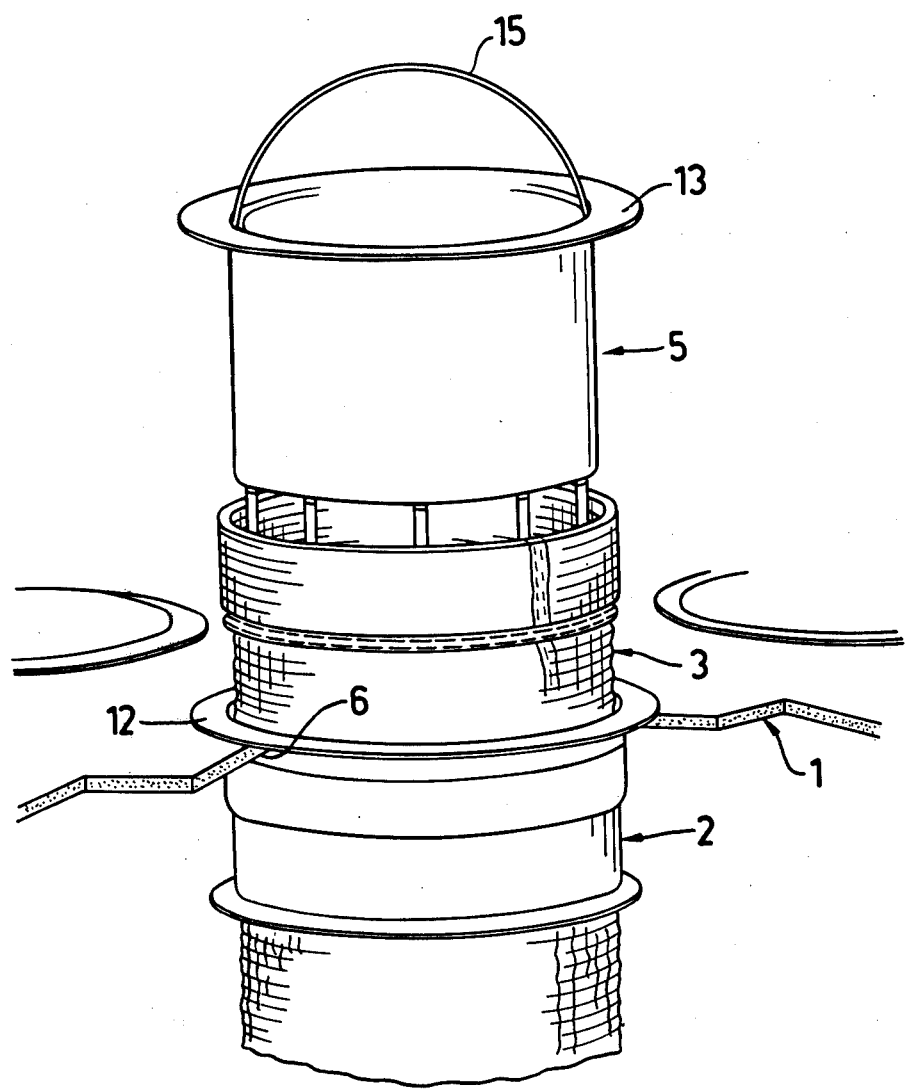
FIG. 2 is a perspective view showing the apparatus in the course of the installation or removal of a bag filter.
Figure 3:
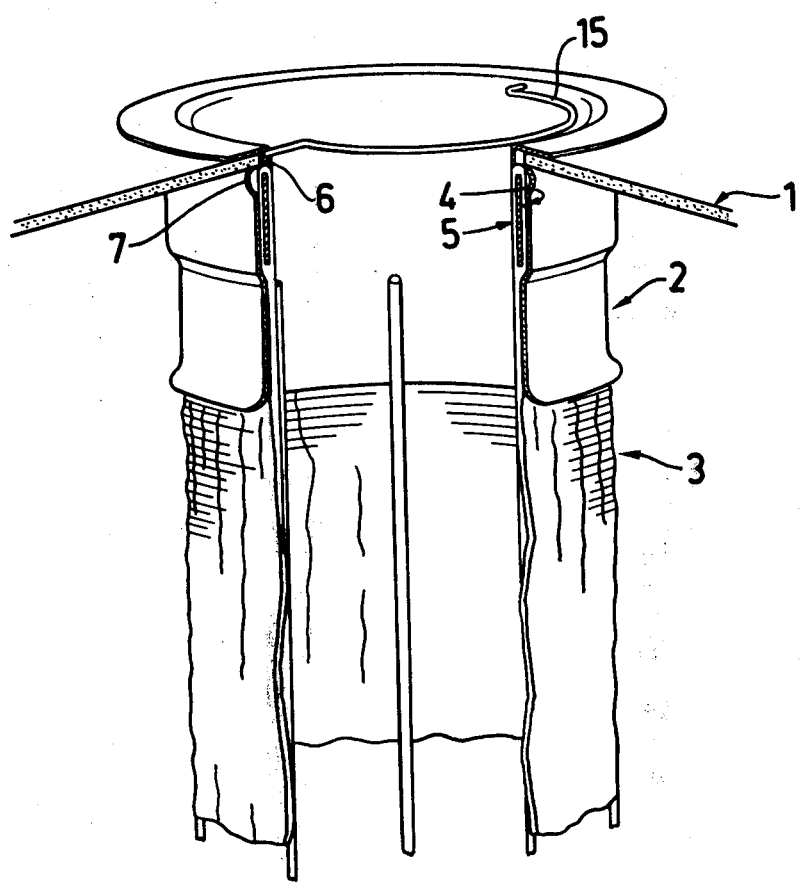
FIG. 3 is a perspective view, with parts broken away, of the installed apparatus of FIG. 1.

FIG. 2 shows the assembling or disassembling stage of use, whereby assembling, dismantling or inspection can be accomplished in seconds without tools or auxiliary aids. One thing which can be potentially advantageous is an auxiliary device in the form of a wire-shaped handle 15 which attaches to the locking cylinder 5 and which can be folded into it as evident from FIGS. 2 and 3. The circular thickening 4 can be of fixed or expanding width, but preferably is of a predetermined minimal width. As to thickness, part 4 can be compressible, expandable or substantially constant. The thickening can be made of the same material as bag filter 3 and can form a homogenous piece with the latter; or, the thickening can be made of some other material, for example of metal, cardboard, plastic or of a similar material, and connected with the bag filter firmly in a detachable manner. The circular thickening can also be a separate cylinder, a strip or a similar contrivance over which the bag filter is pulled, which accomplishes that the free bag filter end rests against the exterior of the cylinder or a comparable body constituting the circular thickening.

The thickening 4 can also be provided to advantage with a radial, preferably circular profile turned inward, offering an easier gripping of the bag filter end during its detachment following removal of locking cylinder 5.

The above-described embodiments should be viewed only as non-limiting examples which can be complemented or modified within the limits of the concept of the invention. Thus for example socket 2 can be embodied in different forms. It can be completely replaced by an appropriate fashioning of the wall 1 or its equivalent, which would retain an appropriate shape corresponding to section 8 and phase 11. The locking cylinder 5 can further be self-expanding, for example by being divided in two by an axial cut so that it can be compressed during insertion and then will expand. The drawings picture the locking of a bag filter of circular form by means of a fixture. The invention can of course be used also in other areas of application, for example for fixture-free filters or for flat, folding and/or casette filters or their combinations or equivalents. The drawing merely shows a cylindrical form of socket 2 and the locking cylinder 5 by way of example. Naturally, these sections can be at least partly of conical shape, and thereby become progressively sealing with increasing compression or pulling of the parts, thus obviating any requirement of tension. At least a certain gas sealing effect can also be established between the flanges 12 and 13, or the bag filter can be interposed between these parts either in continuation of the thickening 4 or it can change within this area to the standard bag filter shape, i.e. to the shape which the drawings demonstrate at 3. In this connection it can be advantageous to form the transition between the flange or collar 12 and the adjoining socket area or between flange 13 and the adjoining area of the locking cylinder 5 as a softly rounded phase, so that the bag filter end protruding above the wall always comes to rest in flat position between the flanges 12 and 13, or that the bag filter end in question can be easily gripped following the removal of the locking cylinder, which further shortens handling time.

What is claimed is:

1. In a filter assembly comprising a wall having an opening therethrough; socket means adjacent and aligned with said opening and supported by said wall; bag filter means having an open end and a circumferential thickened portion extending about said end; said thickened portion being positioned in, and around the interior of, said socket means; and tubular means extending through said opening into said open end inside said socket means, for holding said end between it and the interior of said socket means, the improvement wherein:
   said tubular means has a substantial axially-extending portion and is slidably insertable into, and slidably removable from, said end of said bag filter means while it is positioned within said socket means,
   said tubular means comprises stop means extending radially outwardly of said opening above said wall for limiting the extent of insertion thereof into said end, and gripping means on said tubular means for inserting and removing said tubular means,
   the interior of said socket means having a section, located adjacent the axially-inner end of said thickened portion of said bag means, which section converges toward the exterior of said axially-extending portion of said tubular means, along the direction toward the other end of said bag filter means, so that tensioning of said bag filter means wedges said thickened portion into said converging section to form a substantially gas-tight seal.

2. The apparatus of claim 1, in which said socket means is tubular and secured to said wall.

3. The apparatus of claim 1, in which said socket means extends through said opening and comprises a peripheral outwardly-extending flange on that side of said wall opposite from said converging section of said socket means.

4. The apparatus of claim 1, in which said socket means comprises a further section on the axially opposite side of said convergent section from said opening, said further section having a cross section substantially the same as that of said opening.

5. The apparatus of claim 1, in which said surface said stop means comprises a radially outwardly extending flange on the side of said wall opposite from converging section, for limiting the motion of said tubular means into said socket means.

6. The apparatus of claim 1, in which said tubular means comprises axial rod means secured to the interior thereof and extending outwardly therefrom for serving as a fixture for the interior of said bag filter means.

7. The apparatus of claim 1, in which said tubular means extends inwardly beyond said section of said socket means.

8. The apparatus of claim 1, in which said gripping means comprises a foldable handle attached to said tubular means.

9. Apparatus in accordance with claim 1, in which said socket means, just below said opening, forms a radially-protruding circumferential bulge to assist in retaining said socket means in said opening.

10. Apparatus according to claim 1, in which said thickened portion is self-expanding so as to bear at all times against the adjacent interior surface of said socket means.

* * * * *